United States Patent [19]
Poulin

[11] Patent Number: 6,045,157
[45] Date of Patent: Apr. 4, 2000

[54] COLLAPSIBLE TANK TRAILER RAILING

[76] Inventor: Denis L. Poulin, P.O. Box 1111, Gramercy, La. 70052

[21] Appl. No.: 08/815,143

[22] Filed: Mar. 11, 1997

[51] Int. Cl.[7] .................................................. E04H 17/14
[52] U.S. Cl. .............................. 280/830; 182/113; 256/59
[58] Field of Search ..................................... 280/830, 839, 280/837; 182/113; 296/123; 256/26, DIG. 2, DIG. 6, 59; 52/123.1, 123.2

[56] References Cited

U.S. PATENT DOCUMENTS

| | | | |
|---|---|---|---|
| 51,278 | 11/1865 | Fortun . | |
| 723,312 | 3/1903 | Rogers et al. . | |
| 836,372 | 11/1906 | Dodds . | |
| 933,740 | 9/1909 | Bond ........................................ | 182/113 |
| 1,816,028 | 7/1931 | Thwaits . | |
| 2,676,066 | 4/1954 | Woboril et al. . | |
| 2,738,913 | 3/1956 | Taylor . | |
| 4,371,056 | 2/1983 | Anglade ................................... | 182/127 |
| 4,759,437 | 7/1988 | Bevins ..................................... | 198/632 |
| 4,936,407 | 6/1990 | Brock et al. ............................. | 180/271 |
| 5,071,166 | 12/1991 | Marino .................................... | 280/830 |
| 5,237,932 | 8/1993 | Edwards .................................. | 104/124 |
| 5,634,529 | 6/1997 | Nguyen et al. .......................... | 182/113 |
| 5,749,436 | 5/1998 | Satchwell ................................ | 182/127 |

*Primary Examiner*—Anne Marie Boehler
*Attorney, Agent, or Firm*—David L. Ray

[57] ABSTRACT

A modular collapsible tank trailer railing assembly for connection to a catwalk on the top of a tank on a tank trailer, the modular collapsible tank trailer railing assembly including a base member connected to the catwalk, an upper rail, a middle rail located between the upper rail and the base member, a plurality of posts pivotally connected to the base member, the middle rail, and the upper rail, a handle for rotating one of the plurality of posts to raise and lower the upper rail and the middle rail, and a spring for biasing one of the posts toward the upright position.

65 Claims, 3 Drawing Sheets

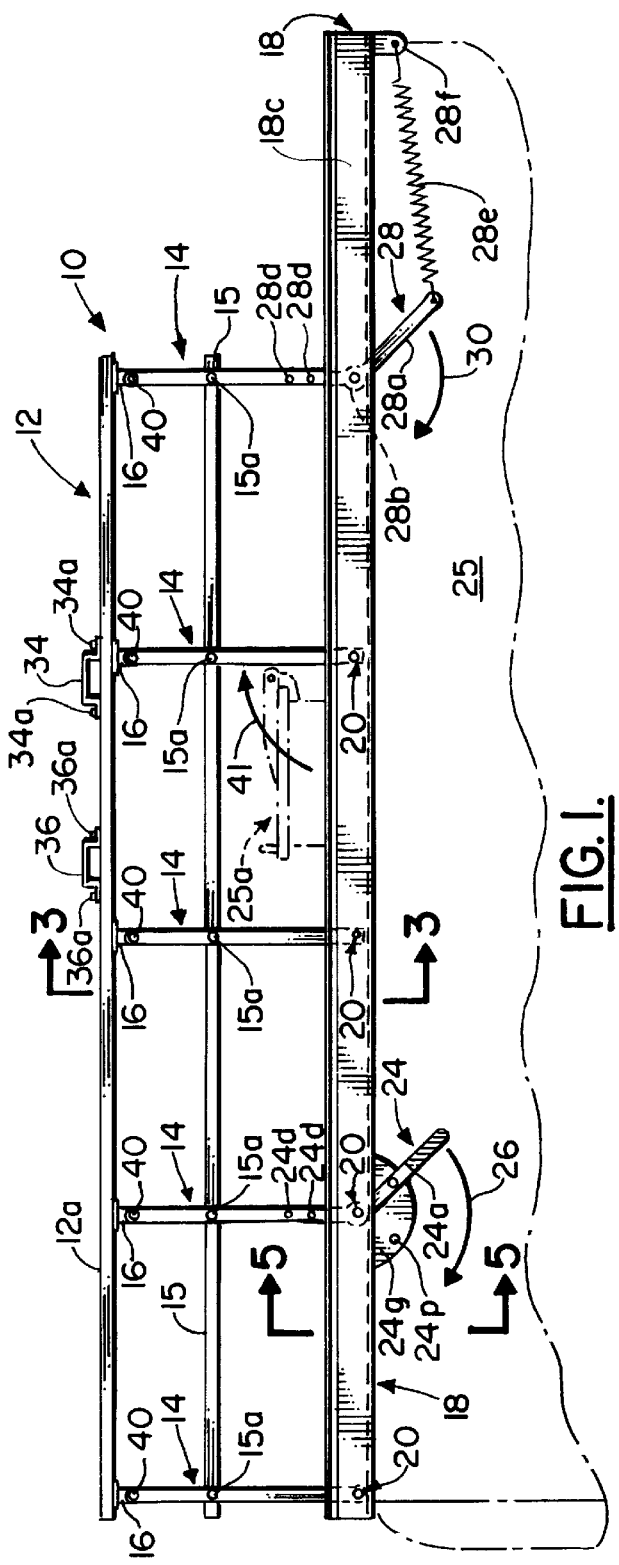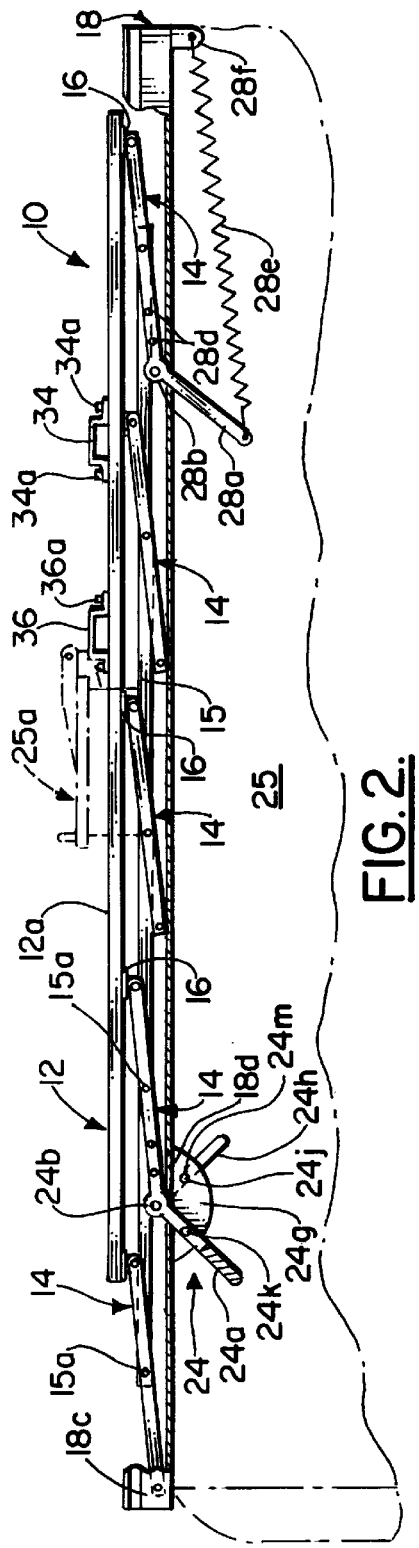

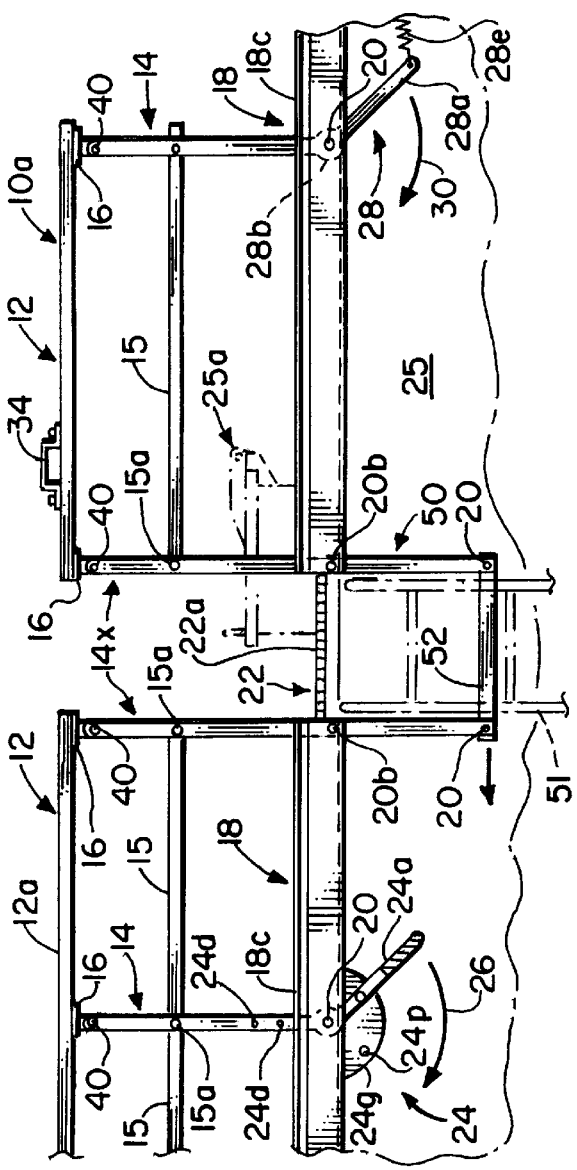
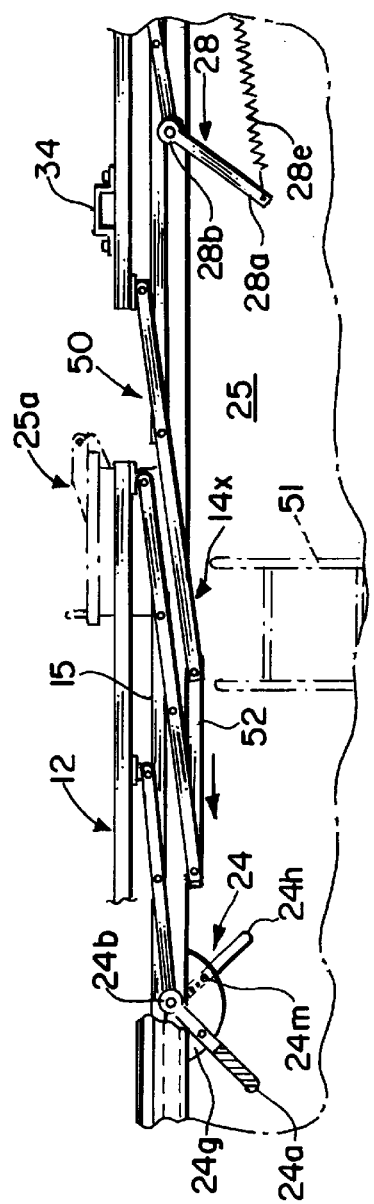
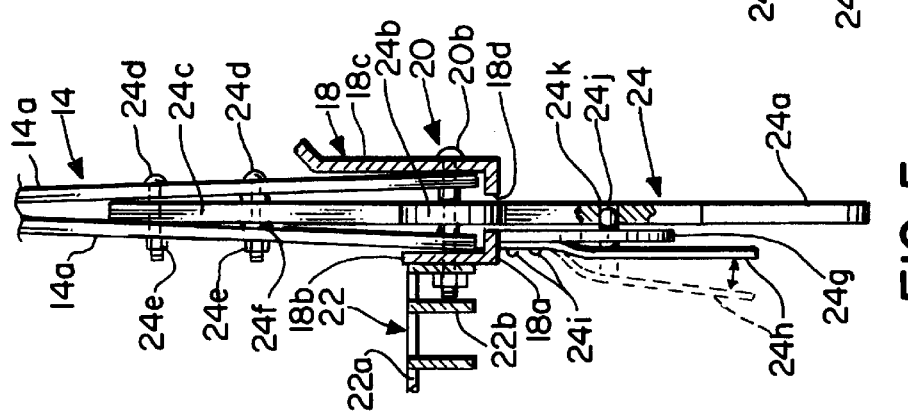
FIG. 7.
FIG. 8.
FIG. 5.

COLLAPSIBLE TANK TRAILER RAILING

BACKGROUND OF THE INVENTION

1. Field of the Invention

The invention relates to tank trailer or tank truck walkways. In particular, the invention relates to walkways on the top of tank trailers towed on highways by tractors and tank trucks driven on the highways of the United States.

2. Description of the Related Art

Tank trailers pulled by tractors on the highways of the United States are used to transport a large variety of fluids, including chemical compounds in a liquid or gaseous states. Such tank trailers have a walkway which is commonly referred to as a "catwalk" on the top thereof which does not have a railing to prevent personnel from falling. Permanent railings on top of the tank could strike bridges, overpasses, or other objects under which the tank trailer may travel.

The catwalk is commonly used on tank trailers to enable personnel to open, close, or inspect the hatch commonly found on top of the tank. Such catwalks pose a safety hazard to personnel utilizing the catwalk. Many serious injuries have been incurred by people falling from tank trailer catwalks.

Exemplary of the Patents of the related art are the following U.S. Pat. Nos. 723,312; 836,372; 1,816,028; 4,371,056; 4,759,437; 4,936,407; 5,071,166; and 5,237,932.

SUMMARY OF THE INVENTION

In accordance with the present invention there is provided a modular collapsible tank trailer railing assembly for connection to a catwalk on the top of a tank on a tank trailer, the modular collapsible tank trailer railing assembly including a base member connected to the catwalk, an upper rail, a middle rail located between the upper rail and the base member, a plurality of posts pivotally connected to the base member, the middle rail, and the upper rail, a handle for rotating one of the plurality of posts to raise and lower the upper rail and the middle rail, and a spring for biasing one of the posts toward the upright position.

The present invention can be built in modular form for easy installation on catwalks of various sizes to minimize tank trailer downtime during installation of the invention.

BRIEF DESCRIPTION OF THE DRAWINGS

FIG. 1 is a side elevational view, partially in phantom lines, of the collapsible railing of the invention in the upright, vertical position;

FIG. 2 is a side elevational view, partially in phantom lines, of the collapsible railing of the invention in the collapsed, horizontal position;

FIG. 5 is an elevational view of the collapsible railing and handle of the invention in the upright, vertical position taken along lines 5—5 of FIG. 1;

FIG. 7 is a detailed, partly cut-away side elevational view of a third embodiment of the collapsible railing of the invention in the upright, vertical position; and FIG. 8 is a detailed, partly cut-away side elevational view of a third embodiment of the collapsible railing of the invention in the collapsed, horizontal position.

DESCRIPTION OF THE PREFERRED EMBODIMENTS

Figure 3:
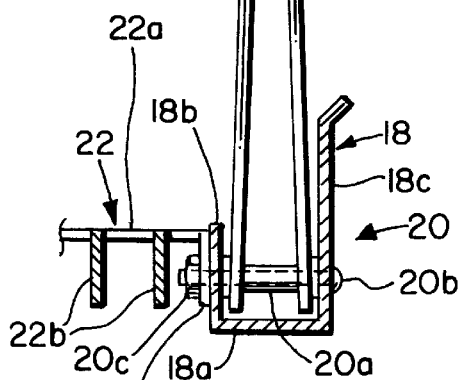
FIG. 3 is an elevational view of the collapsible railing of the invention in the upright, vertical position taken along lines 3—3 of FIG. 1.

Referring now to the drawings, in FIGS. 1–3 is shown the modular collapsible tank trailer railing assembly of the invention generally indicated by the numeral 10. Collapsible tank trailer railing assembly 10 has an upper rail assembly generally indicated by the numeral 12 pivotally connected to the tops of a plurality of pivotal post assemblies generally indicated by the numeral 14 by a plurality of pivot brackets 16. A rigid elongated one-piece middle railing 15 is pivotally connected to the approximate middle of post assemblies 14 by pins 15a.

The bottoms of the post assemblies 14 are pivotally connected to the railing base member generally indicated by the numeral 18 by a plurality of nut and bolt assemblies generally indicated by the numeral 20. The middle of post assemblies 14 are pivotally connected by the rigid middle railing 15. Railing base member 18 is rigidly connected to the catwalk generally indicated by the numeral 22 by nut and bolt assemblies 20.

A handle assembly generally indicated by the numeral 24 pivotally connected to railing base member 18 is rotated in the direction indicated by the arrow 26 in FIG. 1 to lower or collapse collapsible trailer railing assembly 10 to the position shown in FIG. 2. A lever arm assembly generally indicated by the numeral 28 pivotally connected to railing base member 18 spring loads the post assemblies 14 and upper rail assembly 12. Lever arm assembly 28 rotates in the direction indicated by the arrow 30 in FIG. 1 when handle 24a rotates in the direction indicated by the arrow 26 in FIG. 1.

Catwalk 22 is connected to the top of the tank generally indicated by the numeral 25 by any suitable connectors known in the art. Tank 25 is a liquid tank connected to the top of a trailer or truck having a hatch 25a shown in phantom lines for adding fluids thereto. Tank 25, when mounted on a trailer, is towed by a motor driven tractor on roads and highways. Such tractor and trailer combinations are well known in the art and are commonly referred to as "eighteen wheelers".

Catwalk 22 may be used on some tank trailers to enable personnel to attend to the top of the tank 25, or to open, close or inspect hatch 25a, and the like. Exemplary of a trailer having a tank thereon for towing on the highway by a tractor is the tank trailer shown in U.S. Pat. No. 1,816,028, which is hereby incorporated by reference.

Referring now to the components of the collapsible tank trailer railing assembly 10 in greater detail, upper rail assembly 12 can be seen to preferably have two identical hand-holds 34 and 36 thereon for grasping by the user to assist in pulling the collapsible tank trailer railing assembly 10 to the upright position when the user is standing on the catwalk 22. Preferably hand-holds 34 and 36 are hollow aluminum tubing rigidly connected to upper rail assembly 12 by bolts or rivets 34a—34a and 36a—36a, respectively.

Figure 4:
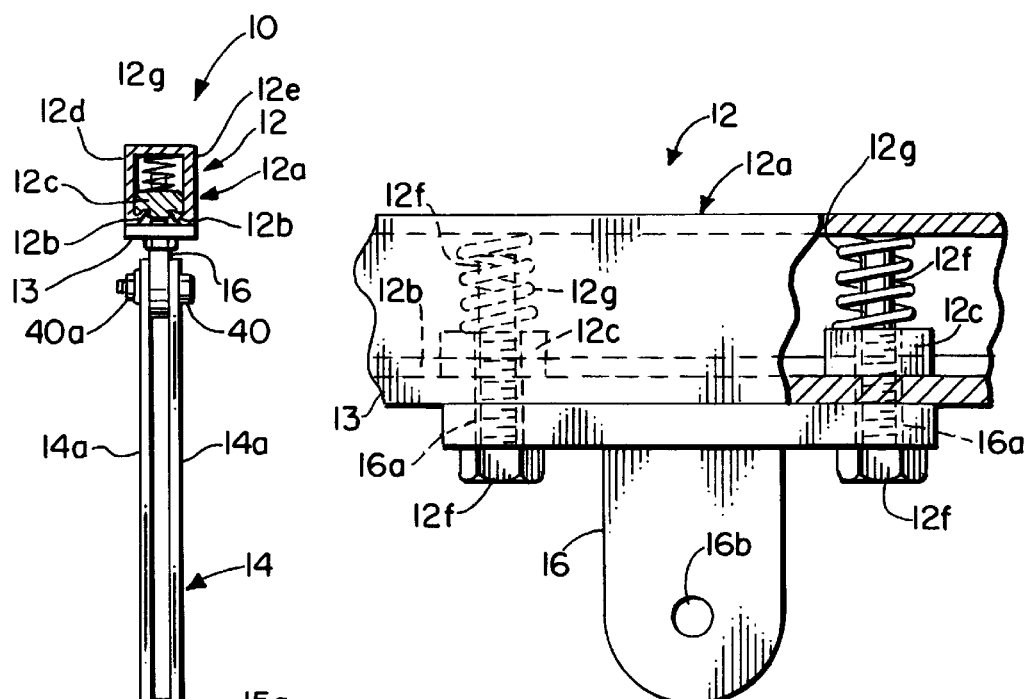
FIG. 4 is a detailed, partly cut-away view of a portion of the top railing and bracket connected thereto of the collapsible railing of the invention.

As can best be seen in FIGS. 3 and 4, upper rail assembly 12 includes an elongated rigid U-shaped channel 12a having two inwardly turned lips 12b—12b in the open side thereof which hold a plurality of nuts 12c therein. The sides of nuts 12c contact the inside of the sidewalls 12d and 12e of channel 12a when bolt 12f is threaded therein and are thereby prevented from turning. Each nut 12c is held against lips 12b—12b by a spring 12g. U-shaped channel 12a is well known in the art and is preferred for ease of construction. However, if desired, a tubular metal channel having a rectangular cross section could be used to replace U-shaped channel 12a.

Connected to the bottom of channel 12a adjacent to lips 12b—12b is an elongated flat metal strip 13 having a rectangular cross-section. Strip 13 is connected to channel 12a by bolts 12f which extend through channels 16a—16a in pivot bracket 16. Pivot bracket 16 has a second channel 16b therein for pivotal receipt of bolt 40.

As can best be seen in FIG. 3, post assembly 14 includes two identical posts 14a—14a. The upper ends of posts 14a—14a are separated by pivot bracket 16 which is pivotally connected to posts 14a—14a by bolt 40 and nut 40a. The approximate mid-point or middle of posts 14a—14a is separated by middle railing 15 which is pivotally connected to posts 14a—14a of each post assembly 14 by a pin 15a. The lower ends of posts 14a—14a are separated by a hollow cylindrical sleeve 20a which receives bolt 20b of bolt assembly 20 therein.

Bolt 20b extends through the railing base member 18. As can best be seen in FIG. 3, railing base member 18 has a generally U-shaped cross-section including a base 18a having an inner side 18b and an outer side 18c extending perpendicularly upward therefrom. Outer side 18c extends upward above the catwalk 22 a distance sufficient to contact the foot or toe of a person standing on catwalk 22 to help prevent a person from stepping off of the catwalk 22 and falling from the catwalk when the modular collapsible tank trailer railing assembly 10 is collapsed as shown in FIG. 2, or raised as shown in FIG. 1. Preferably, outer side 18c extends at least four inches above the top 22a of catwalk 22 to comply with current United States government standards.

The catwalk 22 includes a plurality of elongated parallel brace members 22b—22b connected to the top of tank 25 by welding, bolting, or the like. The brace member 22b closest to base member 18 is bolted thereto by bolt 20b and nut 20c. Top 22a is rigidly connected to brace members 22b by welding, or the like.

When the modular collapsible tank trailer railing assembly 10 is collapsed as shown in FIG. 2, the post assemblies 14 and the middle rail 15 fit completely into the channel formed by the bottom 18a and the sides 18b and 18c of base member 18.

In FIG. 5, handle assembly 24 is shown in detail. Handle assembly 24 includes a handle 24a rigidly connected to a pivot member 24b having a channel therein for pivotal receipt of bolt 20b, and an arm 24c rigidly connected to pivot member 24b and extending longitudinally therefrom. As can be seen in FIG. 5 and in FIGS. 1 and 2, arm 24c is aligned between posts 14a—14a and bolted thereto by bolts 24d—24d and nuts 24e—24e. A spacer or hollow sleeve 24f may be provided for receipt of lower bolt 24d as shown in FIG. 5. Preferably, handle 24a, pivot member 24b, and arm 24c is integrally molded or formed from a single piece of rigid material. Handle 24a rotates in a slot 18d formed in the bottom 18a of base member 18.

As further shown in FIGS. 1, 2, and 5, a semi-circular plate 24g is rigidly connected to the bottom 18a of base member 18 by welding or the like and is aligned parallel to the side of handle 24a. Connected to the back side or tank side of plate 24g is a flexible arm 24h by bolts or pins 24i—24i. Rigidly connected to flexible arm 24h is a bullet-shaped protuberance 24j which fits through hole 24m in plate 24g and is selectively received in channel 24k in handle 24a to lock handle 24a in the position shown in FIG. 1. A second hole 24p is located in plate 24g for receipt of protuberance 24j when handle 24a is in the position shown in FIG. 2 to lock handle 24a in the position shown in FIG. 2.

Lever arm assembly 28 includes lever arm 28a which is molded or formed from a single piece of rigid material and is outwardly shaped identical to the integrally formed handle 24a, pivot member 24b, and arm 24c. Lever arm 28a has a pivot member 28b, and an arm (not shown) identical to arm 24c aligned between posts 14a—14a connected to posts 14a—14a by bolts 28d—28d. A coil spring 28e is connected to lever arm 28a and to bracket 28f which is rigidly connected to base member 18.

To collapse the modular collapsible tank trailer railing assembly 10 from the position shown in FIG. 1 to the position shown in FIG. 2, the handle 24a is grasped by the right hand of the user and the flexible arm 24h shown in FIGS. 2 and 5 is grasped by the left hand. The flexible arm 24h is moved to the position shown in phantom lines in FIG. 5, thereby removing protuberance 24j from channel 24k in handle 24a. Referring to FIG. 1, as handle 24a is rotated in the direction indicated by the arrow 26, post assemblies 14 rotate in the direction indicated by the arrow 41, and lever arm 28a rotates in the direction indicated by the numeral 30. The rotation of lever arm 28a stretches and extends spring 28e to the position shown in FIG. 2. Handle 24a is rotated until it reaches the position shown in FIG. 2, flexible arm 24h is aligned with hole 24p, and protuberance 24j is inserted through hole 24p in plate 24g and into channel 24k in handle 24a to lock handle 24a in the position shown in FIG. 2. FIGS. 2 and 8 show flexible arm before it is moved into alignment with handle 24a to lock handle 24a in the collapsed position shown in FIG. 2.

Figure 6:
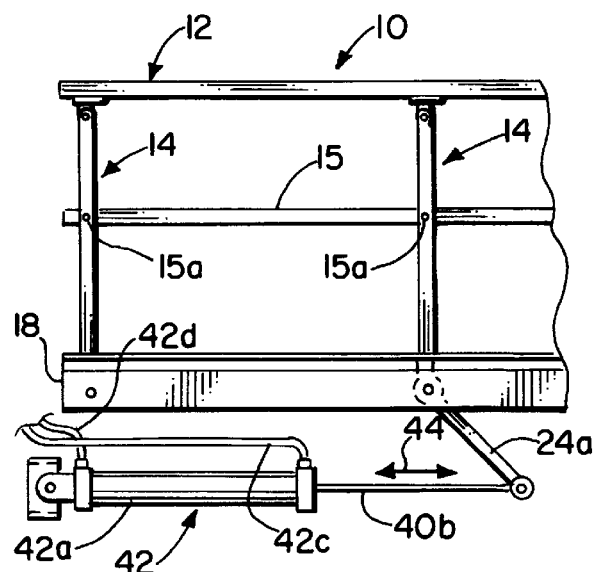
FIG. 6 is a detailed, partly cut-away side elevational view of a second embodiment of the collapsible railing of the invention.

In FIG. 6 is shown a second embodiment of the invention in which a conventional pneumatic or hydraulic cylinder and piston assembly generally indicated by the numeral 42 is connected to handle 24a rotate handle 24a to collapse the modular collapsible tank trailer railing assembly 10 from the position shown in FIG. 1 to the position shown in FIG. 2. As is known to those skilled in the art, pneumatic or hydraulic cylinder and piston assembly 42 includes a cylinder 42a which forces a piston, having a piston rod 42b connected thereto, in cylinder 42a or out of cylinder 42a as indicated by the double pointed arrow 42. Cylinder 42a has two hollow lines 42c and 42d connected thereto for conveying air or hydraulic fluid thereto to force piston rod 42b in cylinder 42a in or out of cylinder 42a as indicated by the double pointed arrow 44. Cylinder 42a could be controlled by a switch mounted at a convenient location on the tank trailer or on tank 24. In the second embodiment of the invention, the lever arm assembly 28 and spring 28e could be eliminated.

In FIGS. 7 and 8 there is shown a third embodiment of the invention in which a ladder generally indicated by the numeral 50 is placed at a desired location, such as in alignment with an existing ladder 51 shown in phantom lines on FIGS. 7 and 8, on the modular collapsible tank trailer railing assembly 10a. The like numbered components of modular collapsible tank trailer railing assembly 10a are similar to or identical to the like numbered components of modular collapsible tank trailer railing assembly 10. To form the vertical side rails of ladder 50, post assemblies 14x replace two adjacent post assemblies 14—14. Post assemblies 14x—14x extend downward beneath base members 18—18 to bottom step 52. A rigid bottom step 52 is pivotally connected to the lower ends of post assemblies 14x—14x by bolt assemblies 20.

Preferably, the upper rail 12a, the middle rail 15, the posts 14a, the base member 18, and the other rigid members of the modular collapsible tank trailer railing assembly of the invention are made from a rigid metal material. A particularly preferred metal is aluminum.

Although the preferred embodiments of the invention have been described in detail above, it should be understood that the invention is in no sense limited thereby, and its scope is to be determined by that of the following claims:

What is claimed is:

1. A modular collapsible tank trailer railing assembly for connection to an elongated horizontal catwalk connected to the top of a tank on a tank trailer, said modular collapsible tank trailer railing assembly comprising:
   a. an elongated U-shaped base member adapted for connection to said catwalk,
   b. an elongated upper rail,
   c. an elongated middle rail located between said upper rail and said base member, said middle rail being received in said U-shaped base member when said upper rail and said middle rail are lowered to the collapsed position,
   d. a plurality of rigid posts pivotally connected to said base member, said middle rail, and said upper rail,
   e. a handle for rotating one of said plurality of posts to raise said upper rail and said middle rail above said base member, and
   f. a spring for biasing one of said posts toward the vertical position.

2. The trailer railing assembly of claim 1 wherein said plurality of posts are received in said U-shaped base member when said upper rail and said middle rail are lowered to the collapsed position.

3. The trailer railing assembly of claim 1 wherein said U-shaped base member has two parallel vertical sides extending upward from a horizontal base.

4. The trailer railing assembly of claim 1 wherein one of said two parallel vertical sides extends upward above the surface of said catwalk a distance sufficient to contact the foot or toe of a person standing on said catwalk.

5. The trailer railing assembly of claim 1 wherein said upper rail is rigid.

6. The trailer railing assembly of claim 1 wherein said middle rail is rigid.

7. The trailer railing assembly of claim 1 wherein said handle has a lock thereon for selectively locking said handle in the raised or collapsed position.

8. The trailer railing assembly of claim 1 wherein said spring is connected to an arm extending from one of said plurality of posts for biasing one of said posts toward the vertical position.

9. The trailer railing assembly of claim 8 wherein said spring is connected to said arm and to said base member.

10. The trailer railing assembly of claim 1 wherein a fluid operated cylinder and piston assembly is connected to said handle to rotate said handle.

11. The trailer railing assembly of claim 1 wherein two adjacent posts extend beneath the bottom of said base member and are pivotally connected by a rigid step member.

12. The trailer railing assembly of claim 1 wherein said upper rail is parallel to said middle rail.

13. The trailer railing assembly of claim 1 wherein said middle rail is parallel to said base member.

14. The trailer railing assembly of claim 1 wherein each of said plurality of posts extends vertically upward from said base member in the raised position.

15. The trailer railing assembly of claim 1 wherein said handle is rigidly connected to one of said posts.

16. A modular collapsible tank trailer railing assembly for connection to an elongated horizontal catwalk connected to the top of a tank on a tank trailer, said modular collapsible tank trailer railing assembly comprising:
   a. an elongated base member adapted for connection to said catwalk,
   b. an elongated upper rail,
   c. an elongated middle rail located between said upper rail and said base member,
   d. a plurality of rigid posts pivotally connected to said base member, said middle rail, and said upper rail,
   e. a handle for rotating one of said plurality of posts to raise said upper rail and said middle rail above said base member, said handle extending beneath said base member, and
   f. a spring for biasing one of said posts toward the vertical position.

17. The trailer railing assembly of claim 16 wherein said base member is generally U-shaped.

18. The trailer railing assembly of claim 17 wherein said middle rail is received in said U-shaped base member when said upper rail and said middle rail are lowered to the collapsed position.

19. The trailer railing assembly of claim 17 wherein said plurality of posts are received in said U-shaped base member when said upper rail and said middle rail are lowered to the collapsed position.

20. The trailer railing assembly of claim 17 wherein said U-shaped base member has two parallel vertical sides extending upward from a horizontal base.

21. The trailer railing assembly of claim 20 wherein one of said two parallel vertical sides extends upward above the surface of said catwalk a distance sufficient to contact the foot or toe of a person standing on said catwalk.

22. The trailer railing assembly of claim 16 wherein said upper rail is rigid.

23. The trailer railing assembly of claim 16 wherein said middle rail is rigid.

24. The trailer railing assembly of claim 16 wherein said handle has a lock thereon for selectively locking said handle in the raised or collapsed position.

25. The trailer railing assembly of claim 16 wherein said spring is connected to an arm extending from one of said plurality of posts for biasing one of said posts toward the vertical position.

26. The trailer railing assembly of claim 25 wherein said spring is connected to said arm and to said base member.

27. The trailer railing assembly of claim 16 wherein a fluid operated cylinder and piston assembly is connected to said handle to rotate said handle.

28. The trailer railing assembly of claim 16 wherein two adjacent posts extend beneath the bottom of said base member and are pivotally connected by a rigid step member.

29. The trailer railing assembly of claim 16 wherein said upper rail is parallel to said middle rail.

30. The trailer railing assembly of claim 16 wherein said middle rail is parallel to said base member.

31. The trailer railing assembly of claim 16 wherein each of said plurality of posts extends vertically upward from said base member in the raised position.

32. The trailer railing assembly of claim 16 wherein said handle is rigidly connected to one of said posts.

33. A modular collapsible tank trailer railing assembly for connection to an elongated horizontal catwalk connected to the top of a tank on a tank trailer, said modular collapsible tank trailer railing assembly comprising:

a. an elongated base member adapted for connection to said catwalk, said base member having a generally U-shaped cross-section, b. an elongated upper rail parallel to said elongated base member, c. an elongated middle rail located between said upper rail and said base member parallel to said elongated upper rail, said middle rail being received in said U-shaped base member when said upper rail and said middle rail are lowered to the collapsed position, d. a plurality of rigid posts pivotally connected to said base member, said middle rail, and said upper rail, e. a handle connected to at least one of said posts for rotating one of said plurality of posts to raise said upper rail and said middle rail above said base member, and f. a spring connected to at least one of said posts for biasing one of said posts toward the vertical position.

34. A modular collapsible tank trailer railing assembly for connection to an elongated horizontal catwalk connected to the top of a tank on a tank trailer, said modular collapsible tank trailer railing assembly comprising:

a. an elongated base member adapted for connection to said catwalk, b. an elongated upper rail, c. an elongated middle rail located between said upper rail and said base member, d. a plurality of rigid posts pivotally connected to said base member, said middle rail, and said upper rail, e. a handle for rotating one of said plurality of posts to raise said upper rail and said middle rail above said base member, and f. a spring for biasing one of said posts toward the vertical position, said spring being connected to an arm extending from one of said plurality of posts and to said base member for biasing one of said posts toward the vertical position.

35. The trailer railing assembly of claim 34 wherein said base member is generally U-shaped.

36. The trailer railing assembly of claim 34 wherein said middle rail is received in said U-shaped base member when said upper rail and said middle rail are lowered to the collapsed position.

37. The trailer railing assembly of claim 34 wherein said plurality of posts are received in said U-shaped base member when said upper rail and said middle rail are lowered to the collapsed position.

38. The trailer railing assembly of claim 34 wherein said U-shaped base member has two parallel vertical sides extending upward from a horizontal base.

39. The trailer railing assembly of claim 38 wherein one of said two parallel vertical sides extends upward above the surface of said catwalk a distance sufficient to contact the foot or toe of a person standing on said catwalk.

40. The trailer railing assembly of claim 34 wherein said upper rail is rigid.

41. The trailer railing assembly of claim 34 wherein said middle rail is rigid.

42. The trailer railing assembly of claim 34 wherein said handle has a lock thereon for selectively locking said handle in the raised or collapsed position.

43. The trailer railing assembly of claim 34 wherein a fluid operated cylinder and piston assembly is connected to said handle to rotate said handle.

44. The trailer railing assembly of claim 34 wherein two adjacent posts extend beneath the bottom of said base member and are pivotally connected by a rigid step member.

45. The trailer railing assembly of claim 34 wherein said upper rail is parallel to said middle rail.

46. The trailer railing assembly of claim 34 wherein said middle rail is parallel to said base member.

47. The trailer railing assembly of claim 34 wherein each of said plurality of posts extends vertically upward from said base member in the raised position.

48. The trailer railing assembly of claim 34 wherein said handle is rigidly connected to one of said posts.

49. A modular collapsible tank trailer railing assembly for connection to an elongated horizontal catwalk connected to the top of a tank on a tank trailer, said modular collapsible tank trailer railing assembly comprising:

a. an elongated base member adapted for connection to said catwalk, said base member having two adjacent posts extending beneath the bottom of said base member, said two adjacent posts being pivotally connected by a rigid step member, b. an elongated upper rail, c. an elongated middle rail located between said upper rail and said base member, d. a plurality of rigid posts pivotally connected to said base member, said middle rail, and said upper rail, e. a handle for rotating one of said plurality of posts to raise said upper rail and said middle rail above said base member, and f. a spring for biasing one of said posts toward the vertical position.

50. The trailer railing assembly of claim 49 wherein said base member is generally U-shaped.

51. The trailer railing assembly of claim 49 wherein said middle rail is received in said U-shaped base member when said upper rail and said middle rail are lowered to the collapsed position.

52. The trailer railing assembly of claim 49 wherein said plurality of posts are received in said U-shaped base member when said upper rail and said middle rail are lowered to the collapsed position.

53. The trailer railing assembly of claim 49 wherein said U-shaped base member has two parallel vertical sides extending upward from a horizontal base.

54. The trailer railing assembly of claim 53 wherein one of said two parallel vertical sides extends upward above the surface of said catwalk a distance sufficient to contact the foot or toe of a person standing on said catwalk.

55. The trailer railing assembly of claim 49 wherein said upper rail is rigid.

56. The trailer railing assembly of claim 49 wherein said middle rail is rigid.

57. The trailer railing assembly of claim 49 wherein said handle has a lock thereon nor selectively locking said handle in the raised or collapsed position.

58. The trailer railing assembly of claim 49 wherein said spring is connected to an arm extending from one of said plurality of posts for biasing one of said posts toward the vertical position.

59. The trailer railing assembly of claim 58 wherein said spring is connected to said arm and to said base member.

60. The trailer railing assembly of claim 49 wherein a fluid operated cylinder and piston assembly is connected to said handle to rotate said handle.

61. The trailer railing assembly of claim 49 wherein two adjacent posts extend beneath the bottom of said base member and are pivotally connected by a rigid step member.

62. The trailer railing assembly of claim 49 wherein said upper rail is parallel to said middle rail.

63. The trailer railing assembly of claim 49 wherein said middle rail is parallel to said base member.

64. The trailer railing assembly of claim 49 wherein each of said plurality of posts extends vertically upward from said base member in the raised position.

65. The trailer railing assembly of claim 49 wherein said handle is rigidly connected to one of said posts.

* * * * *